United States Patent [19]

Boll et al.

[11] Patent Number: 5,277,026
[45] Date of Patent: Jan. 11, 1994

[54] INTERNAL COMBUSTION ENGINE EXHAUST SYSTEM

[75] Inventors: Wolf Boll, Weinstadt; Reinhard Steinkämper, Winnenden; Karl-Heinz Kempka, Esslingen; Karl Zeilinger, Winnenden, all of Fed. Rep. of Germany

[73] Assignee: Mercedes-Benz AG, Stuttgart, Fed. Rep. of Germany

[21] Appl. No.: 14,540

[22] Filed: Feb. 8, 1993

[30] Foreign Application Priority Data

Feb. 22, 1992 [DE] Fed. Rep. of Germany ....... 4205496

[51] Int. Cl.⁵ .................................... F01N 3/28
[52] U.S. Cl. ............................. 60/288; 60/296; 60/299; 60/302; 422/171
[58] Field of Search ............ 60/288, 299, 296, 302; 422/171

[56] References Cited

U.S. PATENT DOCUMENTS 5,097,665  3/1992  Kammel ........................... 60/288

FOREIGN PATENT DOCUMENTS 2259946  6/1974  Fed. Rep. of Germany ........ 60/288

Primary Examiner—Douglas Hart
Attorney, Agent, or Firm—Klaus J. Bach

[57] ABSTRACT

In an exhaust system for an internal combustion engine having a main exhaust conduit with a catalytic converter arranged remote from the engine and a bypass exhaust conduit which includes a start-up catalytic converter arranged close to the engine and joins the main exhaust gas conduit ahead of said remote catalytic converter, an ejector structure is arranged in the main exhaust gas conduit within a housing defining a suction chamber in communication with the bypass exhaust conduit for drawing gas through the bypass exhaust conduit into said main exhaust gas conduit whenever exhaust gas flows from the engine through the main exhaust gas conduit and a main exhaust conduit valve is arranged between the ejector structure and the junction of the main and the bypass exhaust conduits which is closed during start-up operation of the engine to thereby force the exhaust gas to flow through the suction chamber and the bypass exhaust gas conduit via the start-up catalytic converter.

12 Claims, 4 Drawing Sheets

| # INTERNAL COMBUSTION ENGINE EXHAUST SYSTEM

BACKGROUND OF THE INVENTION

The invention relates to an exhaust system for an internal combustion engine.

EP 0 417 412 A2 discloses an exhaust system in which, in addition to a main catalytic converter, there is in each exhaust conduit a start-up catalytic converter arranged near the engine in an annular duct surrounding the exhaust conduit. At low exhaust temperatures, the exhaust pipe is closed in the region of the annular duct by a butterfly valve, whereby the exhaust gases are discharged via the start-up catalytic converter which is activated very quickly.

The disadvantages of this arrangement are that, on the one hand, the downstream main catalytic converter requires a relatively long preheating phase before it reaches the operating temperature and, on the other hand, the start-up catalytic converter and the butterfly valve are subject to very high thermal loads.

It is the object of the invention, in an exhaust system of this type with at least one start-up catalytic converter arranged near the engine and a main catalytic converter arranged remote from the engine, to relieve the start-up catalytic converter of thermal loads at high exhaust gas temperatures but to feed the exhaust gases to the main catalytic converter at as high a temperature level as possible.

SUMMARY OF THE INVENTION

An exhaust system for an internal combustion engine having a main exhaust conduit with a catalytic converter arranged remote from the engine and a bypass exhaust conduit, which has a start-up catalytic converter arranged close to the engine and joins the main exhaust gas conduit ahead of the remote catalytic converter, includes an ejector structure arranged in the main exhaust gas conduit within a housing defining a suction chamber in communication with the bypass exhaust conduit for drawing gas through the bypass exhaust conduit via the start-up catalytic converter into the main exhaust gas conduit when exhaust gas flows from the engine through the main exhaust gas conduit and a main exhaust conduit valve arranged between the ejector structure and the junction of the main and the bypass exhaust conduits which is closed during start-up operation of the engine to force the exhaust gas during engine start-up to flow through the start-up catalytic converter via the suction chamber and the bypass exhaust conduit.

With the exhaust system according to the invention, it is, on the one hand, ensured that catalytic reaction takes place almost instantly while the main catalytic converter, which is arranged relatively for downstream, reaches operating temperature. Preferably, the main exhaust conduit is disposed within, and insulated by, the bypass conduit. On the other hand, the small quantity of exhaust gas flowing back in the bypass conduit to the start-up catalytic converter is sufficiently cooled to effectively protect the start-up converter from overheating during extended operation.

In view of the often limited installation space, a concentric arrangement of the piping of the main exhaust conduit and the bypass conduit is particularly advantageous since it requires little space and provides for relatively low radiation heat losses.

A number of illustrative embodiments of the invention are depicted schematically in the drawings and are described in greater detail below.

DESCRIPTION OF THE PREFERRED EMBODIMENTS

Figures 1, 2:
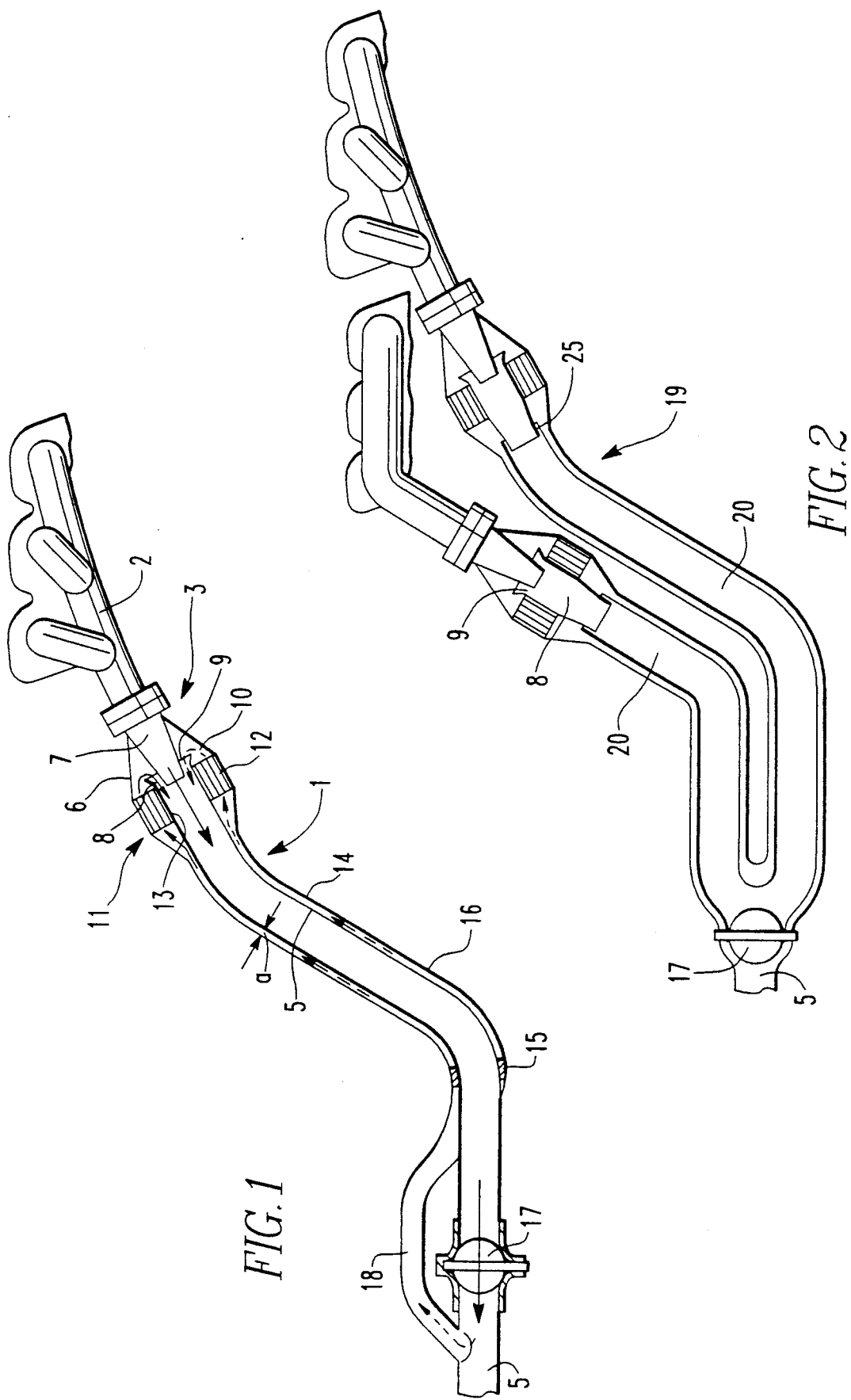
FIGS. 1 to 4 show illustrative embodiments of the invention.

The illustrative embodiment according to FIG. 1 shows a single-pipe exhaust system, which is denoted by the reference numeral 1 and is flanged to a multicylinder internal combustion engine (not shown) via an exhaust manifold 2. Directly adjoining the exhaust manifold 2 is a section 3 of an exhaust conduit 5, this section being designed as a pipe-internal ejector 3. The pipe-internal ejector 3, which is arranged in a housing 6, comprises a discharge nozzle 7 which projects into the housing 6 at the upstream end thereof and through which the exhaust gas flow is directed into an inlet opening 8 located opposite the outlet nozzle 7 and downstream thereof. The inlet opening 8 is funnel-shaped and formed at the upstream end of the exhaust conduit 5. There is an annular gap 9 between the outlet nozzle 7 and the inlet opening 8 providing for open communication between the exhaust conduit 5 and a suction space 10 delimited by the housing 6 and surrounding the pipe-internal ejector 3. The housing 6 arranged concentrically around the exhaust conduit 5 extends in downstream direction and defines an annular space around the exhaust conduit 5 which accommodates a start-up catalytic converter having a body 12 through which centrically a section 13 of the exhaust conduit 5 extends.

Downstream of the start-up catalytic converter 11, the housing 6 tapers down to join an outer tube 14 centrically surrounding the exhaust conduit 5, a clearance "a" being maintained between the exhaust conduit 5 and the outer tube 14. To maintain this clearance "a", inserts 15 may be disposed at appropriate spaced locations between the exhaust conduit 5 and the outer tube 14 so that longitudinal flow through the resulting annular interspace between the exhaust conduit 5 and the outer tube 14 is not inhibited. The annular interspace forms a bypass conduit 16 in parallel to the inner exhaust conduit 5. The concentric arrangement of the conduits 5 and 16 is continued downstream to a point just before an exhaust gas control butterfly valve 17, by which the exhaust conduit 5 can be closed. In this region, the bypass conduit 16 forms a separate pipe 18 which extends in an arc around the exhaust gas control butterfly valve 17 and joins the exhaust conduit 5 between the exhaust gas control butterfly valve 17 and a main catalytic converter (not shown) arranged downstream of the exhaust gas control butterfly valve 17. During warm-up of the internal combustion engine or when the exhaust gases are relatively cold due to extended periods of driven operation of the engine, the exhaust gas control butterfly valve 17 in the exhaust conduit 5 is closed. After flowing through the outlet nozzle 7, the exhaust gases are then forced to enter the suction space 10 through the annular gap 9 and to flow through the start-up catalytic converter 11 and the bypass conduit 16. Due to the proximity of the start-up catalytic converter 11 to the engine and to its relatively small volume, its temperature is rapidly raised to operating temperature by the increasingly hot exhaust gases, with the result that catalytic action starts after only a very short operating period. From the start-up catalytic converter 11, the exhaust gases flow through the bypass conduit 16 and enter the exhaust conduit 5 leading to the main catalytic converter which is arranged downstream of the exhaust gas control butterfly valve 17. The flow pattern in existence when the exhaust gas control butterfly valve 17 is closed, during warm-up of the internal combustion engine, is indicated in the illustrative embodiment of FIG. 3 by direction arrows.

Figure 4:
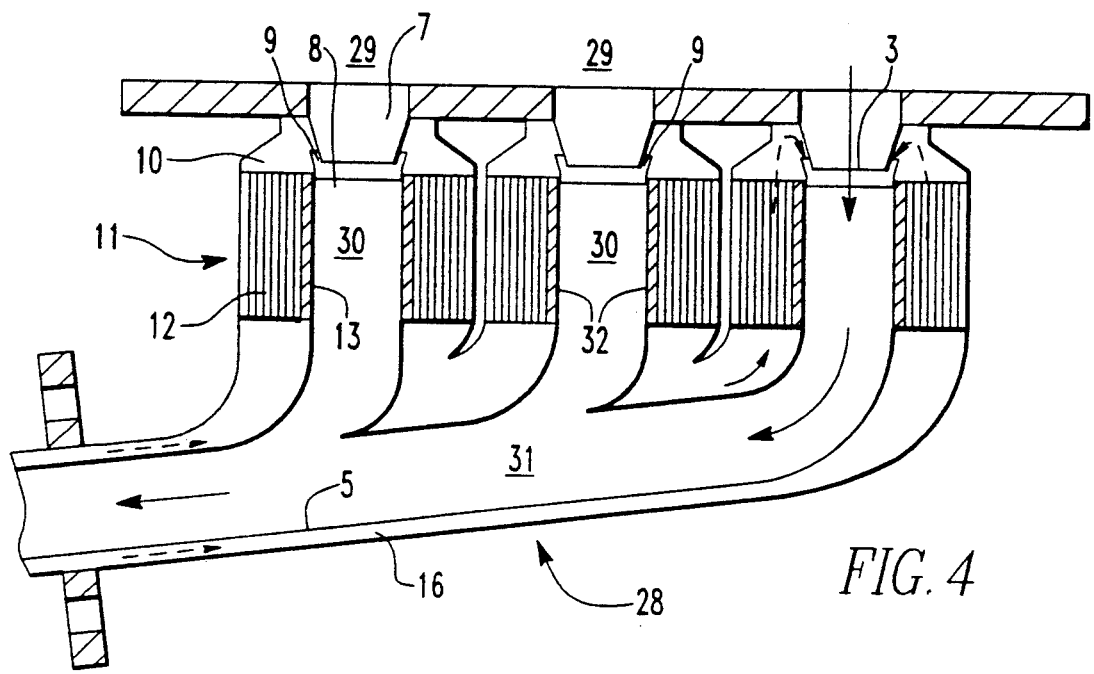

During the warm-up phase, the temperature in the main catalytic converter C through which the flow of exhaust gases is continuous, is generally below the operating temperature of the converter. When operating temperature is reached, the exhaust gas control butterfly valve 17 is opened so that the main flow of the exhaust gases passes through the exhaust conduit 5. In this state, the main flow of exhaust gases reaches the main catalytic converter without flowing through the bypass conduit 16 and the start-up catalytic converter 11. However, as the exhaust gas flows through the discharge nozzle 7 into the inlet opening 8, the exhaust gases generate an ejector effect in the annular gap 9, providing for a vacuum in the suction space 10. Due to this vacuum, some of the exhaust gases are sucked back into the suction space 10 via the bypass conduit 16 in counterflow to the main exhaust gas flow in the exhaust conduit 5. In the process, this partial return flow passes through the start-up catalytic converter 11 in reverse direction and flows back into the exhaust conduit 5 via the annular gap 9. This flow pattern is indicated in FIGS. 1 and 4 by arrows.

With this arrangement, as described with reference to the illustrative embodiment according to FIG. 1, wherein the exhaust conduit 5 is disposed within the bypass conduit 16 and hence is thermally insulated relative to the ambient air maximum temperature can rapidly be achieved in the main catalytic converter although it is arranged a relatively long way downstream. On the other hand, the small return flow of exhaust gas flowing back within bypass conduit 16 is sufficiently cooled by release of heat to the environment so that the returning exhaust gases protect the start-up catalytic converter 11 effectively from overheating. The concentric arrangement of the piping of the exhaust conduit 5 and the bypass conduit 16 exhibits relatively low heat losses and also provides for a particularly small structure which is advantageous in view of the often limited space available.

If increased cooling of the exhaust gases fed back to the start-up catalytic converter 11 is desired, the surface of the bypass conduit 16 can be increased by a corrugated design or by providing ribs.

A further illustrative embodiment, depicted in FIG. 2, shows an advantageous application of the invention to a multiple-conduit exhaust system 19. In this exhaust system 19, each exhaust conduit 20 includes a start-up catalytic converter 11 close to the engine; the conduit routing corresponds to the single-conduit exhaust system 1 according to FIG. 1.

To compensate for the differences in the expansion of the conduits, which are subject to different thermal loads, sliding engagements 25 or other stress-reducing components, e.g. flexible conduit sections, may be arranged at appropriate points as indicated in FIG. 2. The separate exhaust gas flows 20 are joined ahead of the main catalytic converter in a junction structure 21 depicted in greater detail in FIG. 5. This junction structure 21 furthermore contains the exhaust gas control butterfly valve 17 which is arranged immediately downstream of the point of juncture of the exhaust gas flows 20 and it also provides for the passage 22 joining the bypass conduit 16, which is disposed around the exhaust conduit 5, with the exhaust conduit 5, in such a manner that the wall of the inner exhaust conduit 5 terminates at the communication passage 22 and the outer conduit, serving up to that point as the bypass conduit 16, is continued to form the exhaust conduit 5 up to the point of connection with the main catalytic converter.

Figure 5:
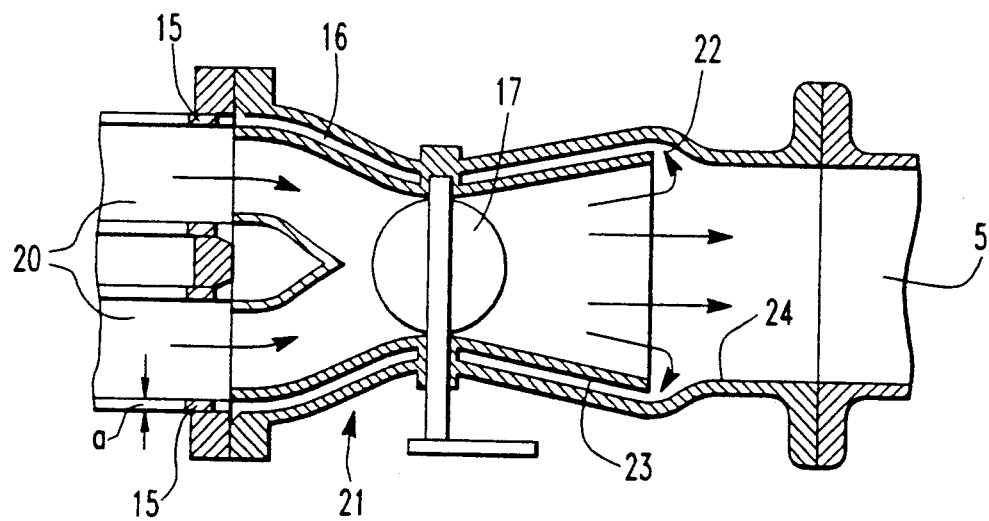
FIG. 5 shows an advantageous configuration of a detail of the illustrative embodiment according to FIG. 2.

As shown in FIG. 5, the passage 22 joining the bypass conduit 16 with the exhaust conduit 5 can be designed in such a way that by means of particular dynamic flow effects return flow of exhaust gas via the bypass conduit 16 when the main catalyst is at its operating temperature, i.e., when the exhaust gas control butterfly valve 17 is open, is enhanced. For this purpose, the end portion 23 of the exhaust conduit 5 widens diffuser-like ahead of the passage 22, resulting, at the passage 22 to the bypass conduit 16, in a relatively high static pressure depending on the exhaust gas flow speed. In addition, there is a step-shaped construction 24 formed in the exhaust conduit 5 immediately downstream of the passage 22 which produces pressure-elevating exhaust gas flow turbulence in the region of the passage 22, thereby enhancing the return flow of exhaust gas through the bypass conduit 16 toward the start-up catalytic converter 11.

Figure 3:
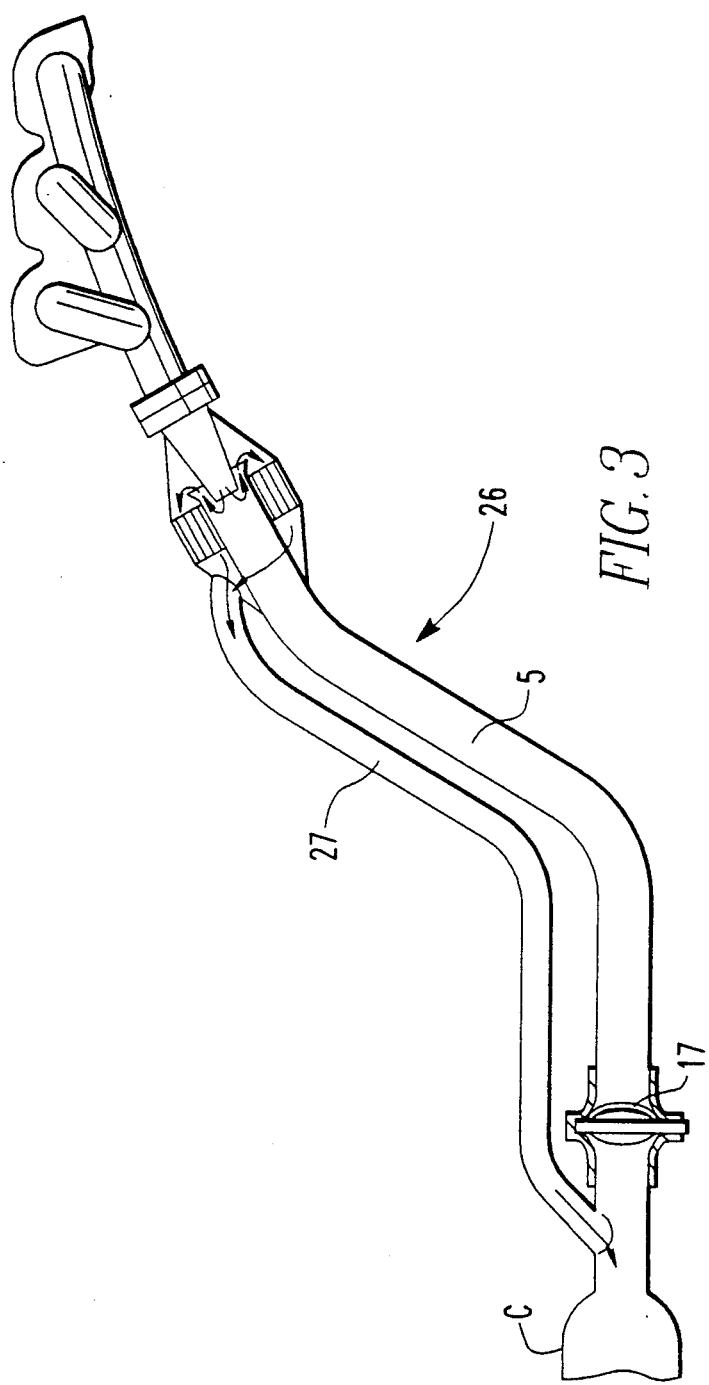

FIG. 3 shows an embodiment of an exhaust system 26 in which the exhaust conduit 5 and a bypass conduit 27 are arranged separately from one another, although the principle on which the routing of the exhaust gas is based does not differ from that described in the embodiment according to FIG. 1.

The separate routing of the conduits depicted in this illustrative embodiment leads to greater heat losses from the exhaust system 26 and hence to reduced heat supply to the main catalytic converter but it also results in further reduction in the thermal loading of the start-up catalytic converter 11 due to the relatively high degree of cooling of the exhaust gas return flow to the start-up catalytic converter 11. Further embodiments are possible, for example, exhaust main and bypass conduits may be disposed in parallel and in contact with one another.

The arrangement depicted in FIG. 4 shows an exhaust manifold 28 embodying the invention, wherein a pipe-internal ejector 3 and a start-up catalytic converter 11 are arranged directly adjacent each exhaust port 29 of the internal combustion engine, the outlet nozzles 7 directly adjoining the exhaust ports 29 and the inlet openings 8 being defined by exhaust manifold branches 30 arranged opposite the outlet nozzles 7 in spaced relationship so as to form the annular gap 9. The exhaust manifold branches 30 are surrounded by the start-up catalytic converter 11 and are in communication with a common manifold structure 31, to which the downstream portion of exhaust conduit 5 (not shown) is mounted. As in the other embodiment, each start-up catalytic converter 11 is disposed directly adjacent the pipe internal ejector 3 and, in this embodiment, is arranged in most direct proximity to the internal combustion engine and is therefore heated rapidly to operating temperature. For joining the bypass conduit 16 to the start-up catalytic converter 11, the exhaust manifold 28 is of double-wall design, wherein such double-wall design is utilized for the exhaust conduit at least up to the exhaust gas control butterfly valve 17 (not shown) arranged in the exhaust conduit 5 at a distance from the start-up catalytic converter 11. To protect the start-up catalytic converter 11 from the effects of the extremely high temperatures of the exhaust branch 30 extending through the start-up catalytic converter 11, an insulating layer 32 composed of a heat-resistant material may be arranged between these components.

The particular features shown in the various embodiments of the invention may be combined as desired in a suitable manner taking into consideration the particular conditions depending on specific applications.

Figures 3A, 4A:
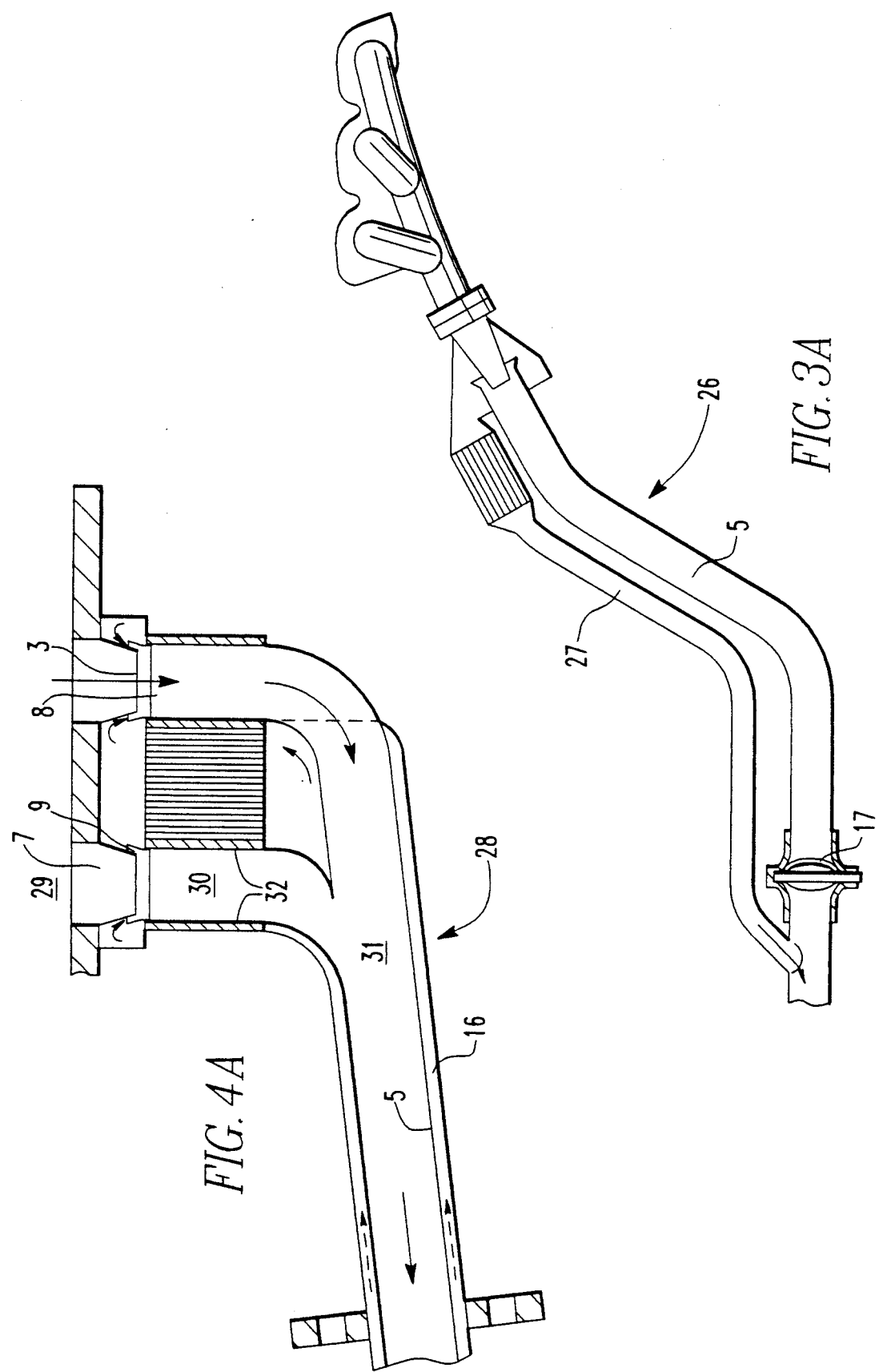

The embodiments of FIGS. 3A and 4A are similar to those of FIGS. 3 and 4. However the start-up catalytic converters are disposed adjacent the exhaust pipes.

What is claimed is:

1. An exhaust system for an internal combustion engine having a main exhaust conduit including at least one catalytic converter arranged remote from said engine and a bypass exhaust conduit which extends along said main exhaust conduit and includes a start-up catalytic converter arranged close to said engine and which joins said main exhaust conduit ahead of said remote catalytic converter, an ejector arranged in said main exhaust conduit and disposed within a housing defining around said ejector a suction chamber which is in communication with said bypass conduit so as to generate a vacuum within said housing when exhaust gas flows from the engine through said main exhaust conduit for drawing gas through said bypass exhaust conduit and said start-up catalytic converter back to said ejector housing, and a main exhaust conduit valve arranged between said ejector and the junction of said main and said bypass exhaust conduits for closing said main exhaust conduit during start-up operation of said engine to thereby force the exhaust gas to flow to the main exhaust pipe via the suction chamber of said ejector through said bypass exhaust conduit and through the start-up catalytic converter disposed therein.

2. An exhaust system according to claim 1, wherein said ejector is formed by an outlet nozzle projecting into said housing and a funnel-shaped inlet structure of said main exhaust conduit surrounding said nozzle in spaced relationship within said housing so as to form an annular gap therebetween providing for communication between the main and the bypass exhaust conduits.

3. An exhaust system according to claim 1, wherein downstream of the start-up catalytic converter, the bypass exhaust conduit and the main exhaust conduit extend essentially parallel to one another.

4. An exhaust system according to claim 1, wherein said start-up catalytic converter is arranged in said housing around the main exhaust conduit.

5. An exhaust system according to claim 4, wherein downstream of the start-up catalytic converter, the bypass exhaust conduit surrounds the main exhaust conduit concentrically.

6. An exhaust system according to claim 1, wherein the exhaust gas control valve in the exhaust conduit is arranged at a distance from the start-up catalytic converter adjacent the junction of said main and bypass exhaust conduits.

7. An exhaust system according to claim 5, wherein said bypass exhaust conduit bypasses the exhaust gas control valve arranged in the exhaust conduit by means of an arc-shaped pipe.

8. An exhaust system according to claim 1, wherein said bypass exhaust conduit is provided with means for increasing its surface area so as to improve heat radiation therefrom.

9. An exhaust system according to claim 1, wherein said exhaust conduits include stress-relieving structures in conduit sections subject to different thermal loads.

10. An exhaust system according to claim 1, wherein the end of the main exhaust conduit is diffuser-like expanded just ahead of the junction of the bypass exhaust and the main exhaust conduits so as to enhance return flow of exhaust gas through the bypass exhaust conduit when said main exhaust conduit valve is open.

11. An exhaust system according to claim 10, wherein a step-like construction is provided in the exhaust conduit immediately downstream of the junction of the bypass and the main exhaust conduits.

12. An exhaust system according to claim 1, wherein said main exhaust conduit valve is a butterfly valve.

* * * * *